(12) United States Patent
Cox et al.

(10) Patent No.: US 7,920,701 B1
(45) Date of Patent: *Apr. 5, 2011

(54) SYSTEM AND METHOD FOR DIGITAL CONTENT PROTECTION

(75) Inventors: Michael Brian Cox, Menlo Park, CA (US); Henry Packard Moreton, Woodside, CA (US); Brian Keith Langendorf, Benicia, CA (US); David G. Reed, Saratoga, CA (US)

(73) Assignee: Nvidia Corporation, Santa Clara, CA (US)

( * ) Notice: Subject to any disclaimer, the term of this patent is extended or adjusted under 35 U.S.C. 154(b) by 1098 days.

This patent is subject to a terminal disclaimer.

(21) Appl. No.: 11/304,408

(22) Filed: Dec. 14, 2005

Related U.S. Application Data

(60) Provisional application No. 60/636,637, filed on Dec. 15, 2004.

(51) Int. Cl.
*H04N 7/167* (2006.01)
(52) U.S. Cl. .............................. 380/201; 380/200
(58) Field of Classification Search .................. 713/189; 380/200, 201
See application file for complete search history.

(56) References Cited

U.S. PATENT DOCUMENTS

| | | | |
|---|---|---|---|
| 5,249,232 A | 9/1993 | Erbes et al. | |
| 5,818,939 A | 10/1998 | Davis | |
| 7,096,370 B1 * | 8/2006 | Klein | 713/193 |
| 7,114,082 B2 * | 9/2006 | Klein | 713/193 |
| 7,474,312 B1 * | 1/2009 | Rohrer et al. | 345/530 |
| 7,782,329 B2 * | 8/2010 | Rohr et al. | 345/534 |
| 2002/0073324 A1 * | 6/2002 | Hsu et al. | 713/189 |
| 2003/0005295 A1 * | 1/2003 | Girard | 713/167 |
| 2003/0084309 A1 | 5/2003 | Kohn | |
| 2003/0126086 A1 | 7/2003 | Safadi | |
| 2003/0142818 A1 | 7/2003 | Raghunathan | |
| 2004/0075621 A1 * | 4/2004 | Shiuan et al. | 345/1.1 |
| 2004/0075622 A1 * | 4/2004 | Shiuan et al. | 345/1.1 |
| 2004/0205281 A1 * | 10/2004 | Lin et al. | 710/306 |
| 2005/0005081 A1 | 1/2005 | Ehama et al. | |
| 2005/0076228 A1 | 4/2005 | Davis | |
| 2005/0078944 A1 * | 4/2005 | Risan et al. | 386/94 |
| 2007/0088959 A1 * | 4/2007 | Cox et al. | 713/189 |

FOREIGN PATENT DOCUMENTS

| | | |
|---|---|---|
| EP | 1801725 A2 * | 6/2007 |
| KR | 2004-52304 A | 6/2004 |
| WO | WO 98/27685 A | 6/1998 |
| WO | WO 03/009115 A | 1/2003 |
| WO | WO 2004/086228 A1 | 10/2004 |
| WO | WO 2005/057535 A | 6/2005 |

OTHER PUBLICATIONS

Hitachi, Ltd., et al., "5C Digital Transmission Content Protection," White Paper, Revision 1.0, Jul. 14, 1998, pp. 1-13.
Hitachi, Ltd., et al., "Digital Transmission Content Protection Specification vol. I (Informational Version)," Revision 1.3, Jan. 7, 2004, pp. 1-76.
PCI Express™ Base Specification Revision 1.1, Feb. 28, 2005, pp. 1-526.
Non-Final Office Action dated Apr. 13, 2009 for related U.S. Appl. No. 11/304,116, filed Dec. 14, 2005.

* cited by examiner

*Primary Examiner* — Matthew B Smithers
*Assistant Examiner* — Jing Sims
(74) *Attorney, Agent, or Firm* — Cooley LLP

(57) ABSTRACT

A digital content system is disclosed. A security engine disposed in a bridge provides cryptographic services. Clear text digital data received from a central processing unit is encrypted and transferred via the bridge over unsecured data paths as cipher text.

21 Claims, 8 Drawing Sheets

SYSTEM AND METHOD FOR DIGITAL CONTENT PROTECTION

CROSS-REFERENCE TO RELATED APPLICATIONS

This application claims the benefit of and priority to provisional application No. 60/636,637, filed on Dec. 15, 2004, the contents of which are hereby incorporated by reference.

This application is related to the commonly assigned copending patent application entitled "Chipset Security Offload Engine," Application Ser. No. 11/304,116, filed Dec. 14, 2005 in the United States Patent and Trademark Office on the same day as the present application, the contents of which are hereby incorporated by reference.

FIELD OF THE INVENTION

The present invention is generally related to techniques to provide digital content protection. More particularly, the present invention is related to techniques for offloading aspects of digital content protection from a central processing unit (CPU).

BACKGROUND OF THE INVENTION

A problem in a number of consumer products is that digital content must be transmitted along signal paths that can be tapped into. As a result, digital content providers are concerned about unauthorized copying of digital content by hackers. For example, a home entertainment system may include a personal computer (PC), graphics sub-system, high-definition television, set-top boxes, digital video recorders and players, and digital versatile disk (DVD) players. Consequently, there is a risk that unencrypted digital content (often known as "clear text" content) may be intercepted by a hacker using, for example, the output of one or more signal buses.

Digital content protection is of increasing importance to protect audio and video content from unauthorized copying. Digital content protection includes, among other things, protocols for encrypting content that will be transmitted over signal buses that can be tapped into. A digital transmission content protection (DTCP) scheme was developed in 1998 by five companies (5C) and is described in the white paper, "5C Digital Transmission Content Protection," published July 1998 by Hitachi, Ltd. Intel Corporation, Matsushita Electric Industrial, Co., Sony Corporation, and Toshiba Corporation, the contents of which are hereby incorporated by reference. Additional details of the DTCP method are described in the "Digital Transmission Content Protection Specification," revision 1.3, published January 2004 by Hitachi, Ltd. Intel Corporation, Matsushita Electric Industrial, Co., Sony Corporation, and Toshiba Corporation, the contents of which are hereby incorporated by reference. The DTCP method may be used with an Institute of Electrical and Electronics Engineers (IEEE) 1394 multimedia bus and includes a protocol for a source device and a sink device (a device that can receive a stream of content) to establish secure transmission of content. The DTCP method includes an authentication and key exchange (AKE) protocol, content encryption, and copy control information (CCI) using an encryption mode indicator (EMI).

One drawback of digital content protection schemes, such as DTCP, is that although content is encrypted on inter-device system buses, clear text data is susceptible to theft at one or more internal data buses. For example, consider DVD playback in a PC based multimedia system. DVD content is received from a DVD player in an encrypted form by a central processing unit (CPU). The CPU decrypts the digital content that it receives. The CPU then re-encrypts the DVD data before writing the data to a display device. However, the decryption and re-encryption performed by the CPU typically necessitates that clear-text data is written to a system memory, where the content is susceptible to theft at a memory bus.

Another drawback of digital content protection schemes is that they impose a significant burden on a CPU performing encryption and decryption of high definition video. For example, the Advanced Encryption Standard (AES) imposes an approximately 16 cycles/Byte (B) encryption cost. Compressed format high definition television (HDTV) corresponds to about 50 MB/s encryption bandwidth such that each high-resolution compressed HDTV content stream corresponds to 800 MHz of the available CPU clock cycles. This is a significant burden on a CPU operating a clock rate of a few Gigahertz. Moreover, in some multimedia systems it is desirable to have the capability to simultaneously handle several video streams such that in the worst case scenario the total encryption/decryption burden on a CPU can consume the majority of CPU clock cycles.

Therefore what is desired is an improved system and method for providing digital content protection.

SUMMARY OF THE INVENTION

A digital content system is disclosed with improved protection of digital content. A security engine disposed in a bridge provides cryptographic services. Clear text digital data received from a central processing unit corresponding to digital content is encrypted and transferred via the bridge over unsecured data paths as cipher text.

One embodiment of a system includes a central processing unit (CPU). A bridge is coupled to the CPU. A memory and a graphics processing unit (GPU) are coupled to the bridge. A security engine is disposed in the bridge. The security engine provides cryptographic services such that clear text digital data received from the CPU is encrypted by the cryptographic engine and transferred via the bridge over unsecured data paths as cipher text. In one embodiment the digital data is video data.

BRIEF DESCRIPTION OF THE FIGURES

The invention is more fully appreciated in connection with the following detailed description taken in conjunction with the accompanying drawings, in which.

DETAILED DESCRIPTION OF THE INVENTION

Figure 1:
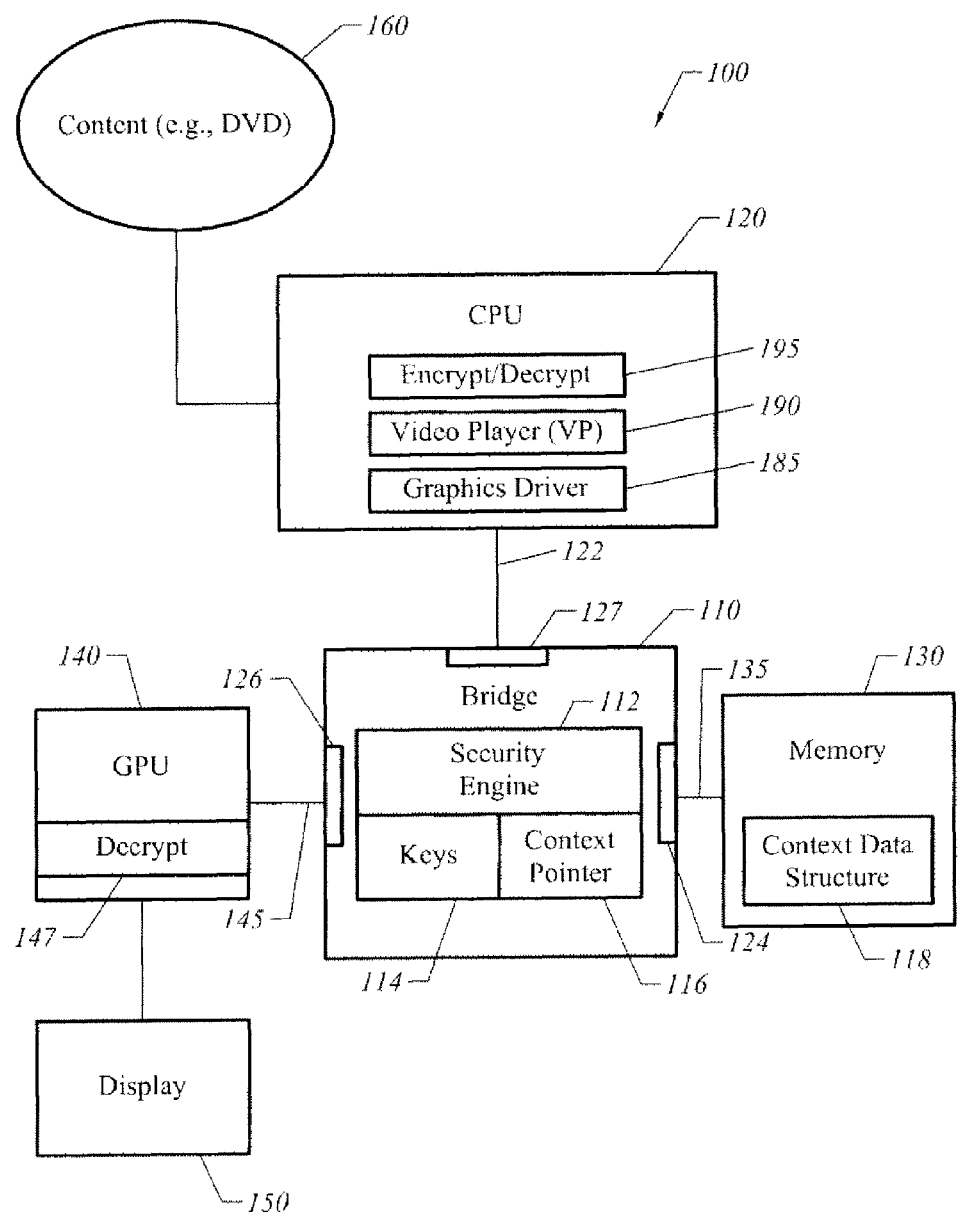
FIG. 1 is a block diagram of digital content protection system having a security engine disposed in a bridge in accordance with one embodiment of the present invention.

FIG. 1 is a block diagram of a digital content system 100 in accordance with one embodiment of the present invention. Digital content system 100 includes a bridge 110 having a security engine 112. In accordance with one embodiment of the present invention, security services, such as the encryption of data for at least one device downstream from CPU 120, is offloaded from CPU 120 to bridge 110 using security engine 112.

Bridge 110 may be implemented as a single chip, as a group of chips, or as a portion of the same chip on which CPU 120 is formed. As described below in more detail, bridge 110 may include any bridge used as part of a chipset to bridge a central processing unit (CPU) 120 to other devices, such as a Northbridge chip, a Southbridge chip, or a combination of a Northbridge and Southbridge chips.

Security engine 112 performs cryptographic services within bridge 110. Exemplary cryptographic services include encryption, decryption, and transcoding (i.e., conversion between different encrypted formats). The cryptographic services may be applied, for example, to data classes which are required to be protected. In some application, all of the data that passes through bridge 110 will require cryptographic services. However, more generally only data requiring protection, such as data requiring digital content protection, may require cryptographic services. The cryptographic services provided by security engine 112 may be utilized to protect data (e.g., digital content, such as video content) along portions of digital content system 100 that are susceptible to hacking.

The cryptographic services can be provided during data access operations, such as data write operations. Encryption/decryption keys 114 are stored in security engine 112 to support the cryptographic services. While a single encryption and/or decryption key may be stored, more generally additional keys may be stored to support more than one type of encryption, decryption, or transcoding. In one embodiment a context pointer 116 points to a source of context data, such as context data 118 within memory 130. Context data 118 includes data structures to permit a context switch to select a specified cryptographic service (e.g., encryption, decryption, or transcoding) to be performed by security engine 112 for particular source/destination addresses. Each context may also indicate a specified encryption/decryption key.

In one embodiment, security engine 112 supports standard encryption and decryption techniques (e.g., Advanced Encryption Standard (AES), Triple Data Encryption Standard (3DES), or public/private key Remote Server Management (RSM)), of compressed or uncompressed data. However, security engine 112 may also be configured to support other encryption protocols. Exemplary transcoding applications include converting from the format of one encryption standard to the format of another encryption standard or to convert between two different encryption keys, such as performing a conversion between AES with a first key to AES with a second key. Security engine 112 is preferably implemented at least in part with dedicated tamper-resistant encryption hardware, which provides benefits in terms of improved security compared to operating encryption/decryption algorithms solely in software. Additionally, implementing security engine 112 with dedicated hardware also permits improvements in performance and power consumption.

Bridge 110 couples a CPU 120, memory 130, and other devices, such as a graphics processing unit (GPU) 140 (illustrated coupled to a display 150). Bridge 110 is coupled to CPU 120 by a bus 122 having a bus interface 121, such as a front side bus (FSB). A bus interface 121 coupling a CPU to a bridge is typically a dedicated high-speed interface that is inherently secure due to soldered connections, embedded circuit paths, and a high data rate that make it difficult to hack into bus 122. Thus, throughout the following discussion it will be understood that clear text data may be transmitted securely from CPU 120 to bridge 110 across bus interface 121 in that it would be extremely difficult for a hacker to intercept data from bus interface 121 in an assembled unit.

In system 100 there are several paths between bridge 110 and other components, such as components 130 and 140, having insecure links. A link is insecure, for example, when a bridge interface 124 or 126 and associated buses 135 or 145 are potentially accessible by a hacker. For example, a memory bus 135 or a bus 145 to GPU 140 may be insecure in that the buses 135 or 145 are not securely soldered and/or have a low enough data rate that hacking into the bus 135 or 145 is feasible.

Input paths include writes of input data into bridge 110 from other devices, such as direct writes from CPU 120 to bridge 110. Output paths include direct writes of output data from bridge 110 to other devices using peer-to-peer techniques such as writes to GPU 140, or to memory 130. Additionally, direct memory access paths include direct writes to memory 130, such as a direct memory access in which CPU 110 writes to memory 130. Bridge 110 may utilize any interface capable of writing data from one device to another device and which is capable of direct memory accesses. In one embodiment, bridge 110 is adapted to utilize a peripheral component interface express (PCI-E) as a high-speed interface with at least one other device, such as GPU 140. PCI-E is a high speed interface standard described in the "PCIe Base Specification" published by the Peripheral Component Interface-Special Interest Group (PCI-SIG), the contents of which are hereby incorporated by reference. However, more generally other industry standard interfaces, such as the peripheral component interface (PCI), may also be used instead of PCI-E couple CPU 110 to bridge 110.

In one embodiment security engine 112 is a PCI device that may, for example, be implemented on PCI bus 0 to permit security engine 112 to be authenticated and certified at the time of motherboard manufacture. In the PCI architecture there are different bus numbers corresponding to a primary bus number, secondary bus number, and subordinate bus number. PCI bus 0 is by definition that bus to which the Host Bridge connects, where the Host Bridge connect the CPU to the PCI System. A privileged write may be used to load encryption/decryption keys into security engine 112.

FIG. 1 illustrates an exemplary application 185 for running a Video Player (VP) application 190 and a graphics driver 185 in CPU 120. Encrypted digital content is received from a digital content source 160, such as DVD player (for the purposes of illustration digital content source player 160 is shown directly attached to CPU 120 although more accurately it would be connected to an input device port). In accordance with a digital content protection protocol, CPU 120 includes encryption/decryption software 195 and reads encrypted digital content from digital content source 160 and performs any initial decryption of encrypted content using encryption/decryption software 195. VP application 190 performs operations for managing the playback and/or storage of one or more video streams.

GPU 140 receives commands from CPU 120 for generating video frames and also receives video data, typically from memory 130. One aspect of GPU 140 is that video processing operations may be offloaded to GPU 140 to reduce CPU utilization. However, another aspect of GPU 140 is that it may generate video frames having improved display attributes. Video content may, for example, be created in an original format that is not optimized for displaying on a personal computer or a high definition television. As an illustrative example, the Nvidia PureVideo Decoder, sold by the Nvidia corporation of Santa Clara, Calif., works with GeForce 6 and 7 series GPUs. The GeForce 6 and 7 series GPUs include a programmable video processor, an MPEG-2 decoding engine, and a motion estimation engine. The Nvidia PureVideo Decoder utilizes hardware acceleration to perform filtering, scaling, format conversion, and other operations to accelerate video playback. Additionally, a variety of operations may be utilized to improve the display of video content on desktop personal computers, notebook personal computers (PCs), and high-definition televisions (HDTVs) with a reduction in visual artifacts, including sub-pixel calculations to reduce aliasing effects. It will thus be understood throughout the following discussion that in one embodiment GPU 140 supports one or more features to improve video playback and reduce CPU utilization, such as programmable video processing, MPEG-2 decoding, de-interlacing, inverse telecine, filtering, scaling, format conversion, and motion estimation.

CPU 120 may be based on any suitable microprocessor. As one example, CPU 120 may be a microprocessor supporting a virtual machine implementation. A virtual machine implementation permits a microprocessor CPU to be logically divided into separate partitions dedicated to performing different functions. In digital content applications this permits, for example, a partition to be dedicated to servicing digital content. As an illustrative example, one partition in a virtual machine may be dedicated to video player software. In a virtual machine implementation, the video player partition is isolated from all other partitions so that no other software may read or modify the video player's data. Virtual machine support provides improved security against software attacks, while security engine 112 provides improved security against hardware attacks. As one example of a CPU designed to operate as a virtual machine, Intel has developed a 64 bit Pentium microprocessor with integrated security features designed to support the codenamed "Longhorn" version of the Windows® operating system of the Microsoft Corporation of Redmond, Wash.

In accordance with conventional content protection schemes, a command stream sent to GPU 140 on bus 145 needs to be encrypted, and is then decrypted in GPU 140 using a GPU decryption engine 147. Conventionally, CPU 120 would also have to perform the function of re-encrypting digital content sent to bridge 110 so that the output on bus 145 is encrypted. However, in accordance with the present invention, bridge 110 performs any necessary re-encryption of data. Thus, the re-encryption function is offloaded from CPU 120, improving CPU performance. Moreover, security engine 112 can include dedicated hardware that reduces the power consumption required for encryption/decryption compared with a software-based encryption/decryption within CPU 195. Additionally, in one embodiment bridge 110 encrypts data transmitted across memory bus 135 for storage in memory 130, improving security.

Figure 2:
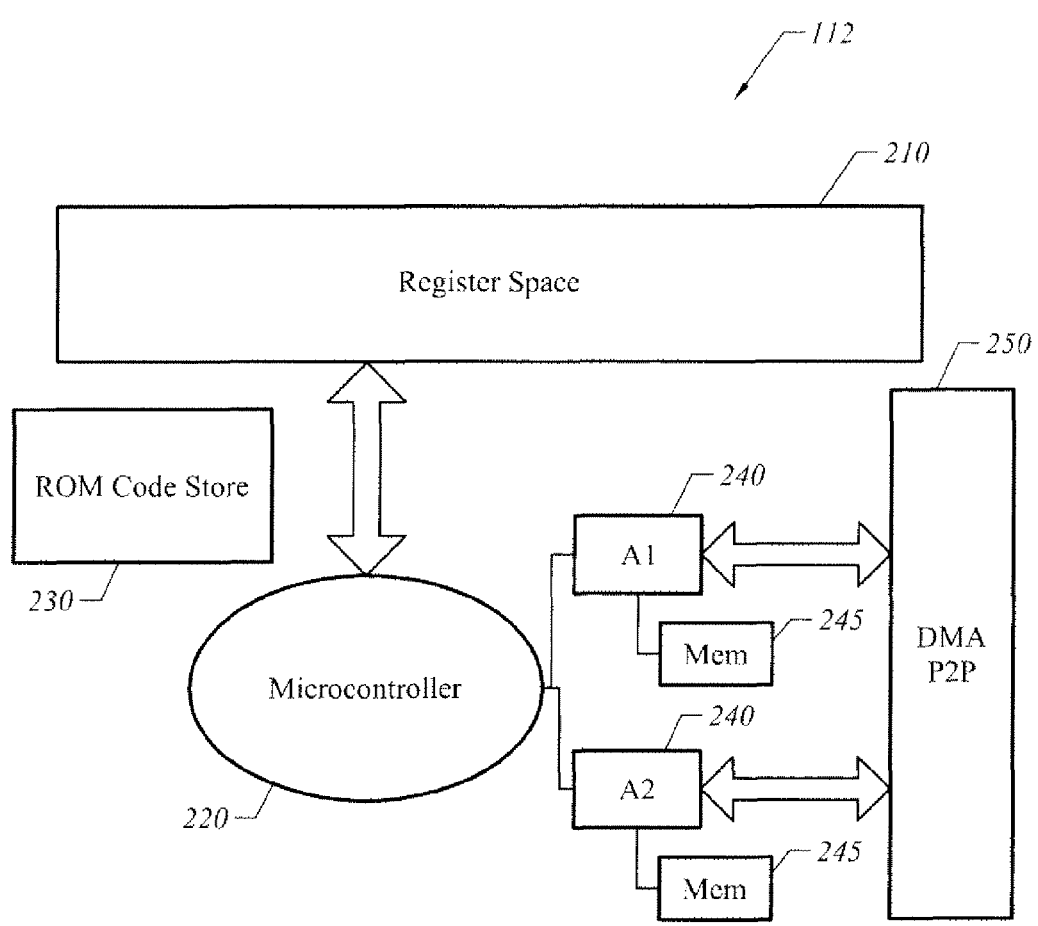
FIG. 2 is a block diagram of a security engine in accordance with one embodiment of the present invention.

FIG. 2 illustrates an exemplary implementation of security engine 112. In one embodiment security engine 112 includes a register space 210, microcontroller 220, and read only memory (ROM) code store 230. Each supported encryption algorithm may include dedicated tamper resistant cryptographic hardware modules 240 (commonly known as "encryption hardware") for executing an encryption/decryption algorithm and associated on chip memory buffers 245. A communication module 250 supports direct memory accesses (DMA) and peer-to-peer (P2P) communication with other components of system 100.

Figure 3:
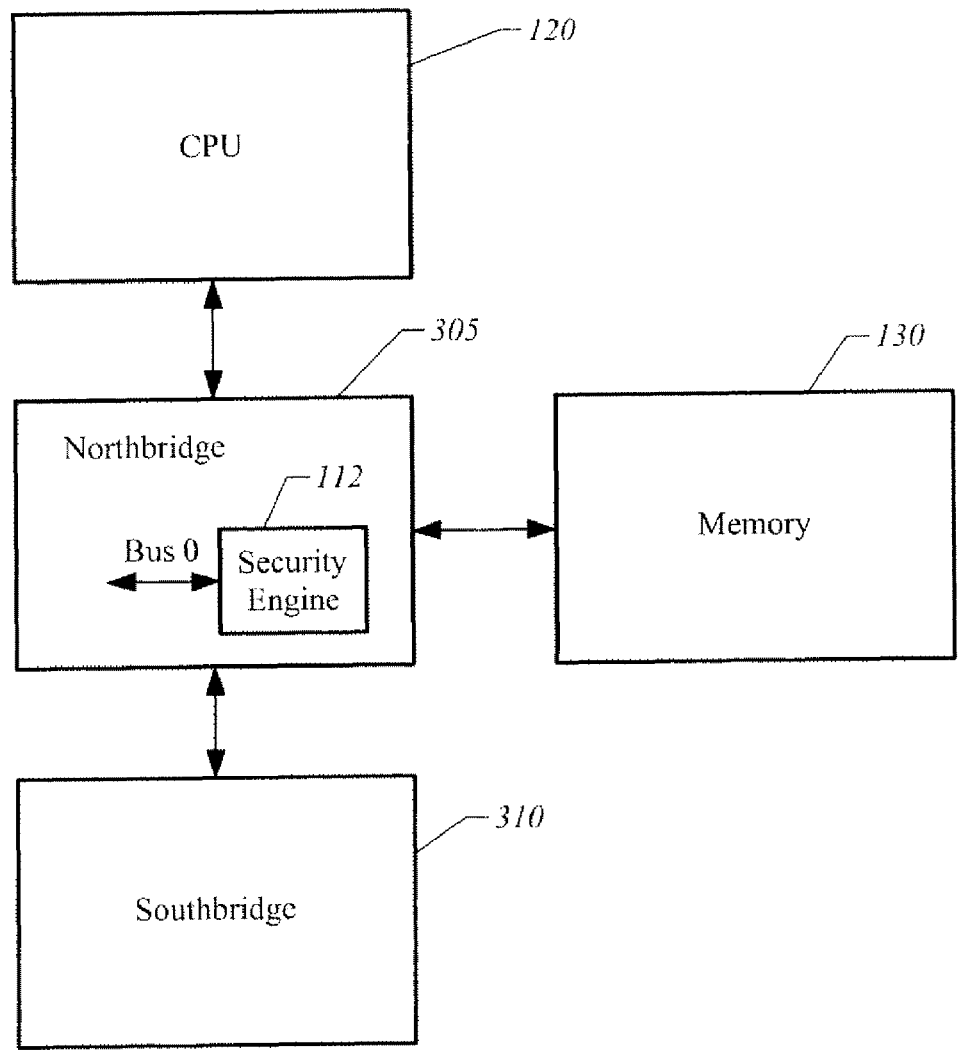
FIG. 3 is a block diagram of a Northbridge implementation in accordance with one embodiment of the present invention.

FIG. 3 illustrates a Northbridge architecture. In this embodiment, security engine 112 is disposed in a Northbridge chip 305. A conventional Southbridge chip 310 is coupled to Northbridge chip 305.

Figure 4:
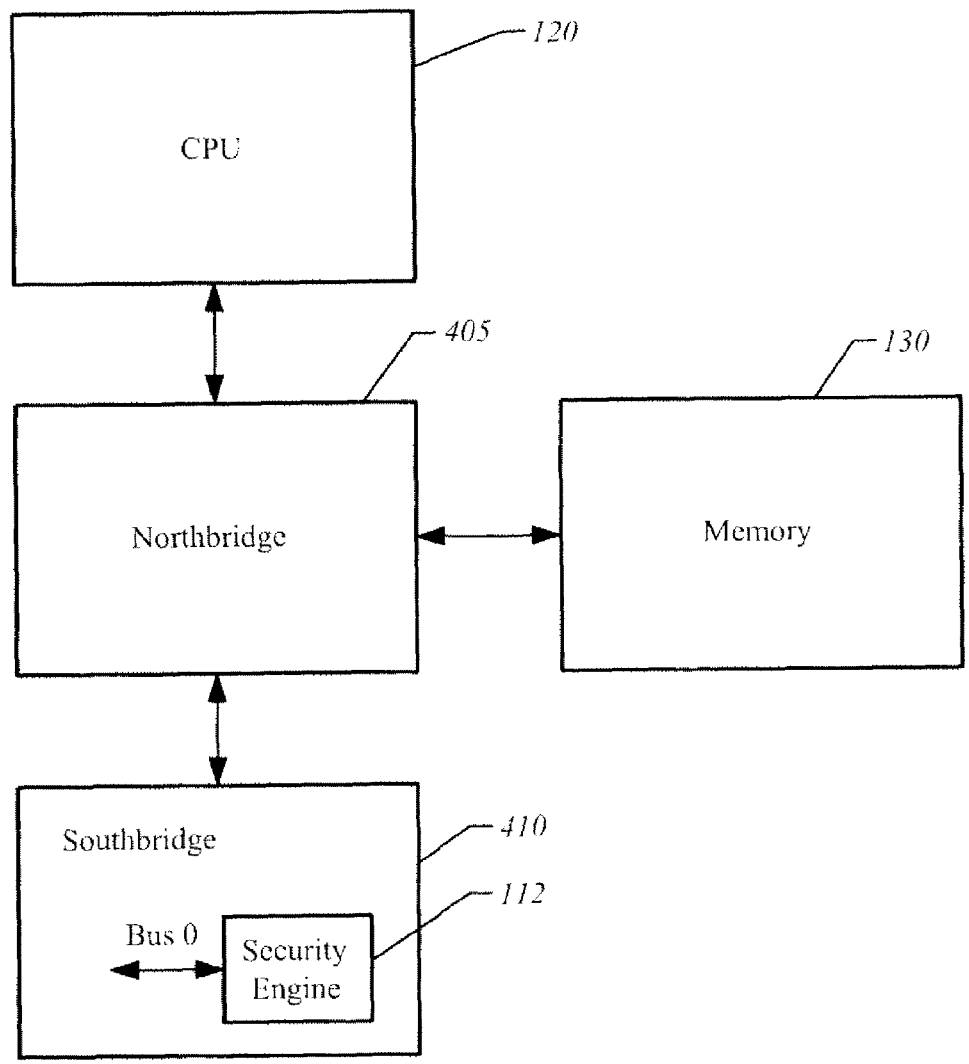
FIG. 4 is a block diagram of a Southbridge implementation in accordance with one embodiment of the present invention.

FIG. 4 illustrates a Southbridge architecture. In this embodiment security engine 112 is disposed within a Southbridge chip 410. Southbridge chip 410 may be coupled to a Northbridge chip 405. However, some microprocessor CPUs, such as the AMD K8 processor, have an integrated Northbridge functionality such that it will be understood that Southbridge chip 410 may be connected directly to a CPU 120.

As previously described, in one embodiment security engine 112 is designed to work in a PCI architecture environment (e.g., a PCI-Express environment, such as that described in the PCI-E specification or the PCI 2.2 specification, which are both published by PCI-SIG, the contents of each of which are hereby incorporated by reference). The PCI architecture supports CPU and device read and write transactions to memory, as well as reads and writes to devices via special configuration, I/O, and memory-mapped I/O (MMIO) transactions. Each PCI-compliant device supports a "configuration space" that allows the device to be discovered, queried, and configured. Each "configuration space" may optionally support address regions by which the CPU and other devices may read and write to the device. These regions are defined by "Base Address Registers" (BARs).

Figure 5:
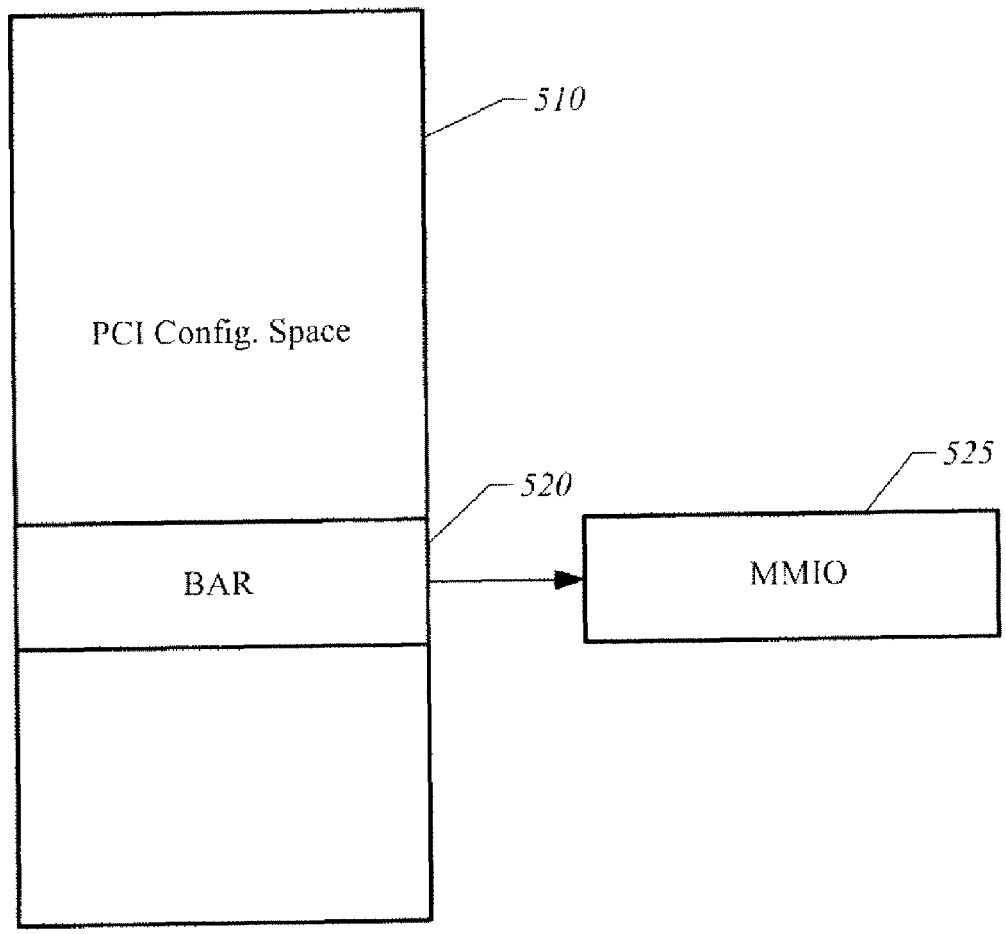
FIG. 5 illustrates a PCI configuration space in accordance with one embodiment of the present invention.

FIG. 5 illustrates a PCI configuration space 510 having a Base Address Register 520 that permits access to a memory-mapped address range via memory-mapped reads and writes from the CPU or other device. Device control and data structures can be embedded in the address regions pointed to by BAR's. For example, the control and data structures described below can be embedded in one or more address regions pointed to by a BAR in one embodiment of security engine 112.

Figure 6:
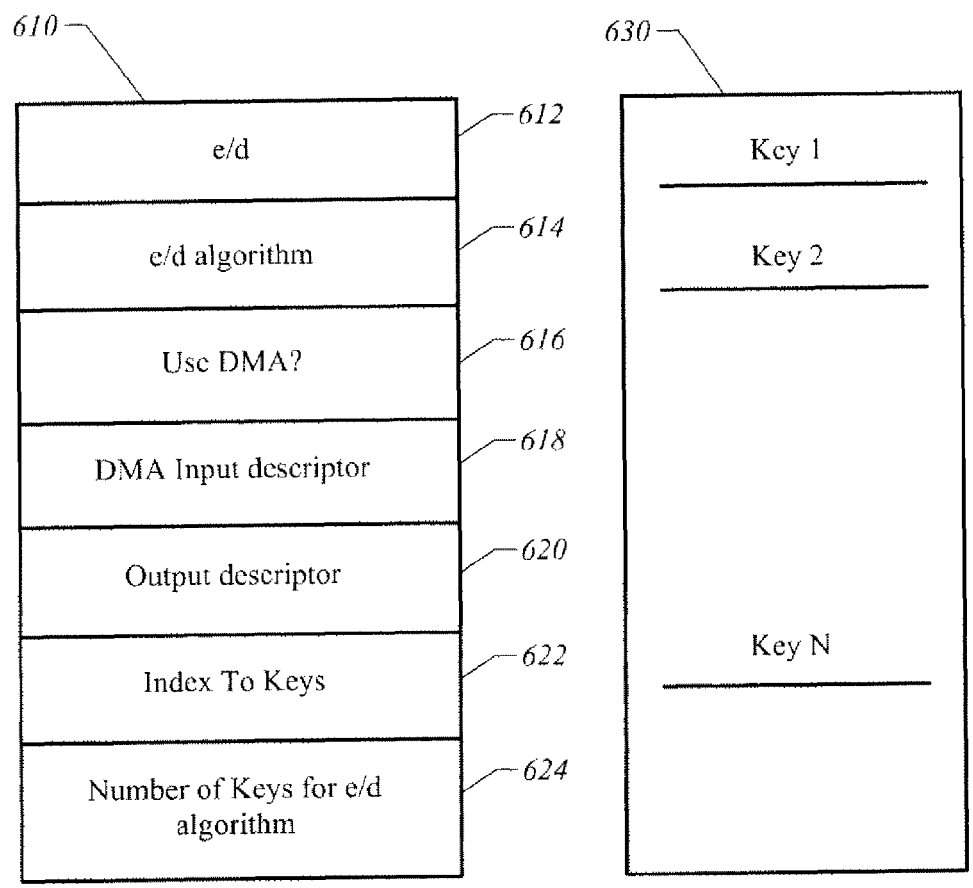
FIG. 6 illustrates a context data structure in accordance with one embodiment of the present invention.

FIG. 6 illustrates an exemplary context data structure 610 for implementing a context switch. In one embodiment, security engine 112 is capable of supporting an integer number, M, of simultaneous sessions corresponding to M instances of context data structure 610. An array of keys 630 permits different encryption, decryption, or transcoding algorithms requiring different keys (or more than one key) to be utilized. In one embodiment an integer number, N, of keys is supported by the array of keys 630. A context is selected based on source address, destination address, and memory attributes (e.g., a direct memory access). An exemplary context data structure 610 includes context information e/d field 612 defining whether encryption or decryption is to be performed, e/d algorithm field 614 defining the encryption/decryption algorithm to be used, a field defining whether DMA is used 616, a DMA input descriptor field 618 defining the parameters required by the device for DMA from memory, an output descriptor field 620 defining the parameters required for output from the device, an index field 622 which identifies the first key in the array of keys 630, and a number field 624 indicating the number of keys to be used by the encryption/decryption algorithm.

The exemplary context data structure 610 may also be expressed as pseudocode. In one embodiment the security engine supports an integer number, M, of contexts, and an integer number, N, of on-chip keys. Each context may use a variable number of keys. Each context in addition has requisite information to be able to read input data (or have input data written to it), and requisite information to be able to write output data. A DMA address descriptor table or other descriptor may be included to support DMA accesses. An index to a current context is provided, which enables fast context switch (to change context, change the current index). An offset from the Base Address Register is provided to allow the security engine 112 to be implemented as one of several functions in a single PCI device. In pseudo-code, these data structures are mapped into one or more security engine BAR's as follows:

integer N
    integer M
    index current context
    Offset_from_base_address MMIO_input Key keys[N]
    An exemplary context data structure is as follows: struct {
    Boolean encrypt_not_decrypt;
    Enumerated encryption_decryption_algorithm;
    Boolean use_dma
    DMA_input dma_input
    Output output
    index start_key (index into keys)
    integer number of keys
(number of keys must be consistent with encryption_decryption_algorithm) } Contexts[M]
and where struct DMA_input {
    Address data_descriptor_table integer length
    }
    struct Output {
    Address addr
    integer limit
    }

The present invention permits several different input modes in which security engine 112 can be used to encrypt, decrypt or transcode. The input to security engine 112 can be direct writes from the CPU, direct writes from another device, or an input made via a direct memory access. As one example, memory mapped writes to the device can be made by the CPU or by another device via peer-to-peer transactions. As one example, the CPU can write clear text into security engine 112. The security engine then encrypts and writes cipher text to a destination. As another example, a CPU or other device can write cipher text to the security engine 112. In this case, the security engine 112 decrypts the cipher text and writes clear text output to a destination. For the case of a direct memory access input, a direct memory access is used to read content data from memory that is written by the CPU or another device. For the case that the direct memory access is to clear text data, security engine 112 performs encryption and writing of cipher text. For the case that the direct memory access is to clear text data, security engine 112 decrypts and writes clear-text data.

The output can be to physical memory or to another device using peer-to-peer. In one embodiment the output is determined by a programmable address. For example, the programmable address can be an output address range in physical memory or in the memory space of another device.

Input modes include MMIO writes by the CPU 120 or other devices using peer-to-peer writes. Output modes include direct memory access to memory and peer-to-peer. In one embodiment CPU 120 may directly write clear text data to the encryption engine 112. Encryption engine may write encrypted data to memory 130, eliminating the need to store clear text data in memory 130.

Exemplary applications of the present invention include applications in encrypting and decrypting video for playback; encrypting and decrypting between different standards (i.e., transcoding) for storage applications, such as network storage; encrypting; decrypting, or transcoding network traffic; and applications for encrypting and decrypting content in personal video recorder systems.

Figure 7:
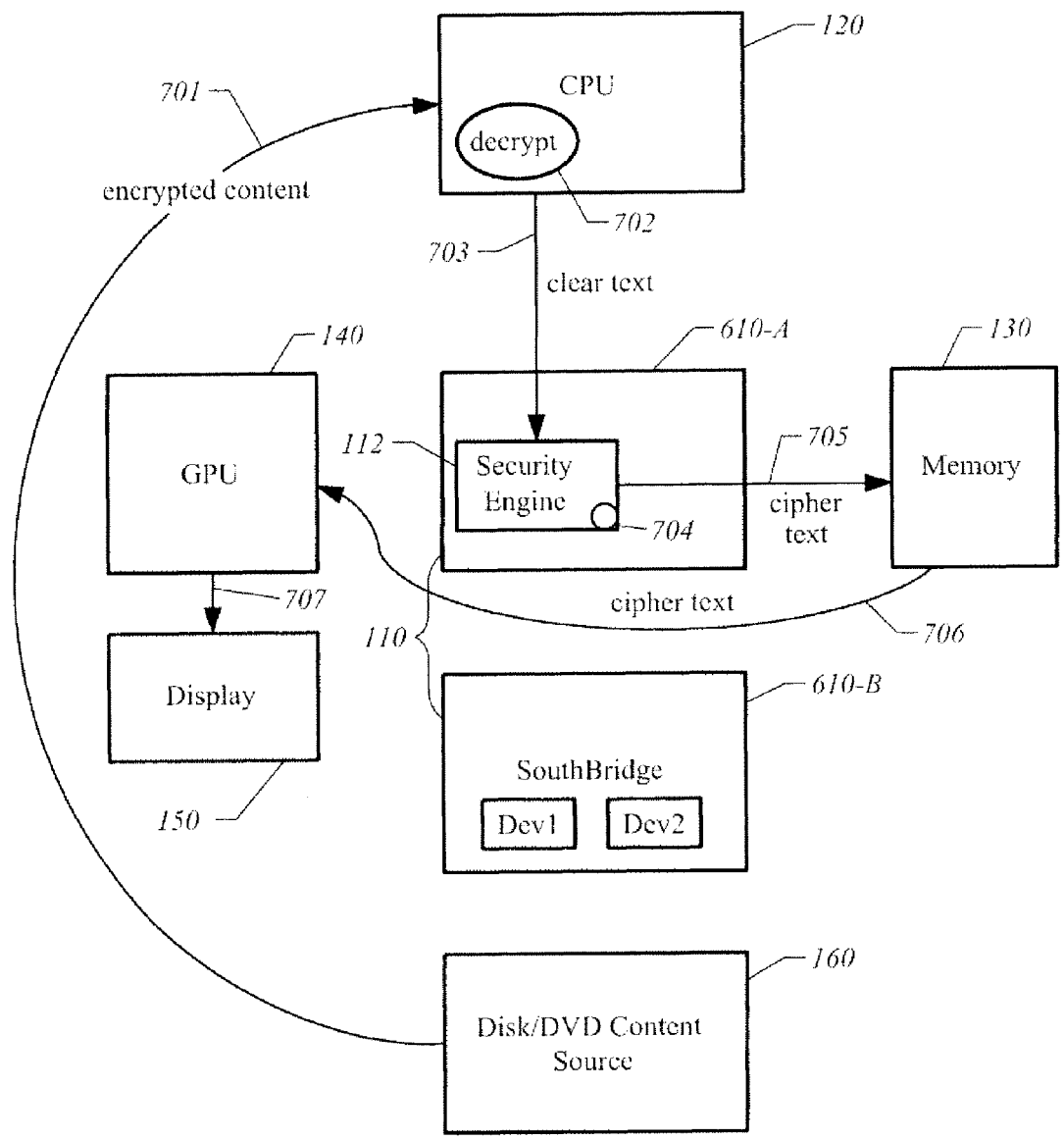
FIG. 7 illustrates an exemplary sequence of operations for digital content protection in accordance with one embodiment of the present invention.

FIG. 7 illustrates an exemplary sequence of operations for securely displaying video. As an illustrative example, bridge 110 is illustrated as a Northbridge chip 610-A and a Southbridge chip 610-B. The buses between components are omitted for illustrative purposes to simplify the drawing. As indicated by arrow 701, CPU 120 reads video data from a video content source 160. In accordance with content protection protocols, the content is encrypted. CPU 120 performs decryption 702 within CPU 120 using software decryption techniques. Clear text data is sent 703 by CPU 120 to the security engine 112. Since a front side bus is difficult to tap, the transmission of clear text data from CPU 120 to security engine 112 is inherently secure. The security engine 112 encrypts the data 704. The security engine 112 then uses a direct memory access to write 705 cipher text to memory 130. As a result, any content transmitted over a memory bus (not shown) is secure. GPU 140 then uses a direct memory access to read 706 cipher text. GPU 140 then decrypts and displays 707 the content.

Referring to FIG. 7, one benefit provided by the present invention is that content can be transmitted and stored as cipher text in portions of the system susceptible to hacking. Thus, digital content protection is improved. Additionally, the CPU overhead associated with encrypting content is reduced, improving CPU performance. Additionally, security engine 112 is preferably designed to be more power efficient than CPU 120 at performing encryption and decryption operations. As result, offloading of encryption/decryption operations to security engine 112 can reduce power consumption.

Figure 8:
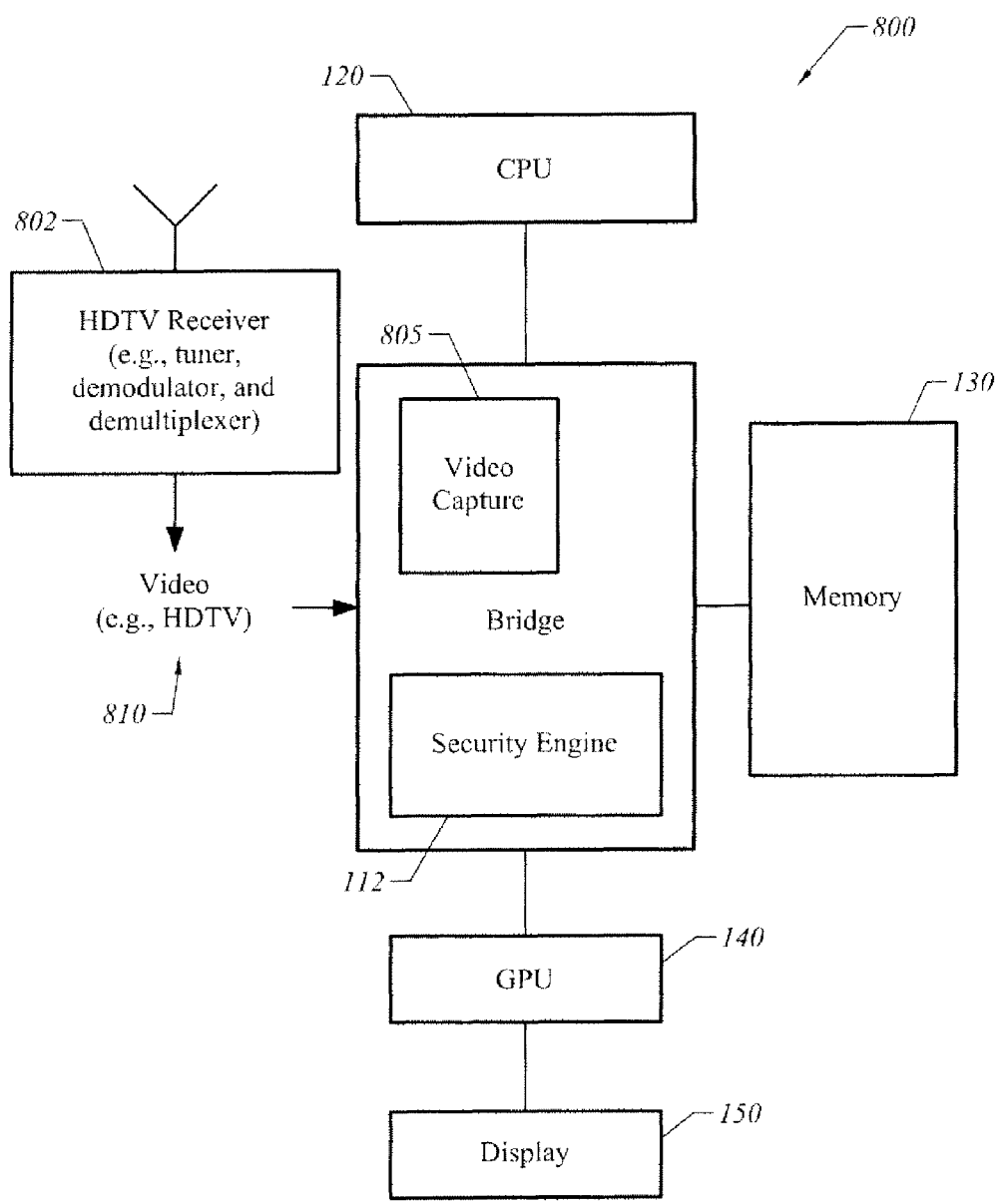
FIG. 8 is a block diagram of a digital content protection system for video data in accordance with one embodiment of the present invention.

Another application of the present invention is in Personal Video Recorder (PVR) applications. PVRs record television signals, such as HDTV signals. FIG. 8 illustrates an exemplary PVR system 800 for digital television (DTV). PVR system 800 may, for example, be a media center personal computer having a CPU 120, GPU 140, display 150, memory 130, and at least one bridge, such as bridge 110. A video capture (VC) module 805 in include in PVR system 800 and may, for example, be included in bridge 110. VC module 805 capture broadcast signals 810 for storage. An HDTV receiver 802 may be coupled to PVR system 800 to receive broadcast signals. HDTV receiver 802 may, for example, perform demodulation and decoding to generate video signals 810 in the form of a transport stream of demodulated data packets. The video signals 810 may be received directly by bridge 110 or be coupled into bridge 110 from another component, depending upon the implementation.

It has been proposed that future television receivers be required to recognize a broadcast flag and in response to detecting a broadcast flag implement a digital content protection scheme to protect the captured video from being distributed via the Internet or other mass methods. As a result, any copies of broadcast HDTV signals that are received are kept in a protected format such that it is difficult for an end-user to distribute unprotected copies of video content. The broadcast flag, may for example, be included in the headers of Advanced Television Systems Committee (ATSC) video packets in accordance with the Program and System Information Protocol (PSIP). In one embodiment of the present invention, PVR system 800 detects whether a broadcast flag is present in video signals 810. If a broadcast flag is present, encryption/decryption services required to support digital content protection are offloaded to security engine 112. For the case of a PVR application, many of the processes are identical to that described in FIG. 7 except that the source of data is broadcast signals and the presence of a broadcast flag is monitored. For example, PVR system 800 may encrypt copies of received video signals for storage in memory 130 for later playback and perform decryption required for subsequent playback.

While an exemplary application of the present invention has been described, more generally it may be used to provide encryption, decryption, or transcoding services for a variety of different types of devices and memories. Encryption, decryption, or transcoding services may be provided to a memory stick or for network storage devices. For example, in a network storage device security engine 112 may be used to encrypt data for storage. In one embodiment for network storage security engine 112 performs transcoding in which the encryption format is changed from a first encryption format (e.g., an encryption format for data transmitted over a network) to a second encryption format (e.g., an encryption format for data storage).

In one embodiment security engine 112 is formed in a separate device that is distinct from bridge 110. For example, security engine 112 may be formed on a different chip than bridge 110. In this embodiment an input/output interface, such as PCI-E, may be used to couple the security engine 112 to other components in the chipset. An advantage of this alternate implementation is that it permits the functional benefit of security engine 112 to be achieved in the chipset with a different physical partitioning. As one example, a basic chipset may be designed without security engine 112. For those markets requiring enhanced security, devices including security engine 112 may then be coupled, via an I/O interface, to the basic chipset design to produce chipsets with enhanced security.

As previously described, the context state is stored in memory to support the use of multiple contexts. In a virtual machine implementation (e.g., Longhorn), the partitions provide a high degree of protection from software attacks, as previously described. However in a system that does not have partitions for providing container isolation, such as a system running Linux or WinXp, it may be desirable to provide additional protection of context information stored in memory to increase security. In one embodiment a key is stored in the hardware of security engine 112 to encrypt/decrypt the context state that is stored in memory. This permits the context state to be stored in memory as cipher text, thereby improving security compared with storing context state information in memory as clear text.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A digital content system with improved digital content protection, comprising:
   a central processing unit (CPU) executing associated software configured to receive an encrypted version of digital content from a source of digital content and in response perform decryption to generate and securely transmit clear text digital data corresponding to said digital content;
   a bridge coupled to said CPU by a secure data path, said bridge securely receiving from the CPU said clear text digital data corresponding to said digital content;
   a memory coupled to said bridge by a first insecure data path;
   a graphics processing unit (GPU) coupled to said bridge by a second insecure data path; and
   a security engine disposed in said bridge, said security engine providing cryptographic services such that said clear text digital data is encrypted by said security engine and transferred via said bridge over said first insecure data path and said second insecure data path as cipher text to protect said digital content,
   wherein digital content is transmitted and stored as cipher text in portions of said digital content system susceptible to hacking of insecure data paths so that transmission and storage of said digital content within the digital content system is secure; and
   wherein said security engine identifies a current context within an index of contexts, where the current context has a corresponding key used to implement a specified cryptographic service.

2. The system of claim 1, wherein said security engine has a mode of operation in which said security engine writes said cipher text to said memory.

3. The system of claim 2, wherein said security engine has a mode of operation in which said security engine provides said cipher text to said GPU via a direct memory access.

4. The system of claim 2, wherein said security engine has a mode of operation in which said security engine provides said cipher text to said GPU via peer-to-peer access.

5. The system of claim 1, further comprising a video capture module to capture broadcast video signals, wherein said security engine has a mode of operation in which said security engine encrypts broadcast video signals received by said system in response to detecting a broadcast flag.

6. The system of claim 1, wherein said clear text digital data is clear text video data.

7. The system of claim 1, wherein said security engine has a mode of operation in which said bridge receives commands for said GPU from said CPU, said security engine in said bridge encrypts said commands to generate encrypted commands, and said bridge writes said encrypted commands to said GPU.

8. The system of claim 1, wherein said security engine comprises tamper-resistant cryptographic hardware and a communication module to support communication with other components coupled to said bridge.

9. The system of claim 8, wherein said communication module is adapted to support direct memory accesses.

10. The system of claim 8, wherein said communication module is adapted to support peer-to-peer communication.

11. The system of claim 1, wherein said GPU is coupled to said bridge via at least one of a peripheral component interface (PCI) and a peripheral component interface express (PCI-E) bus.

12. The digital content system of claim 1 wherein said security engine identifies said current context based on a memory address.

13. A video system with improved digital content protection, comprising:
a central processing unit (CPU) including an associated video player application and decryption application configured to read encrypted video content from a video content source and in response perform decryption to generate and securely transmit clear text video data;
a bridge coupled to said CPU by a secure data path through which said bridge securely receives said clear text video data from said CPU;
a memory coupled to said bridge by a first insecure data path;
a graphics processing unit (GPU) coupled to said bridge by a second insecure data path; and
a security engine disposed in said bridge, said security engine providing cryptographic services such that said clear text video data received from said CPU is encrypted by said security engine and transferred via said bridge over said first and said second insecure data paths as cipher text;
wherein said video content is transmitted and stored as said cipher text in portions of said video system susceptible to hacking of insecure data paths so that transmission and storage of said video content within the video system is secure; and
wherein said security engine identifies a current context within an index of contexts, where the current context has a corresponding key used to implement a specified cryptographic service.

14. The system of claim 13, wherein said security engine comprises tamper-resistant cryptographic hardware and a communication module to support communication with other components coupled to said bridge.

15. The system of claim 14, wherein said communication module is adapted to support direct memory accesses.

16. The system of claim 14, wherein said communication module is adapted to support peer-to-peer communication.

17. The system of claim 13, wherein said system includes a video capture module to capture broadcast video signals and said security engine has a mode of operation in which said security engine encrypts broadcast video signals received by said system in response to detecting a broadcast flag.

18. The system of claim 13, wherein said security engine has a mode of operation in which said security engine encrypts clear text video data received from said CPU, said clear text video data corresponding to video data input generated by a digital versatile disk (DVD) player.

19. The video system of claim 13 wherein said security engine identifies said current context based on a memory address.

20. A method of providing digital content protection, comprising:
operating a video playback application and a decryption application in a central processor unit (CPU) to read encrypted video content from a video content source and in response create for secure transmission at least one stream of digital video content in the form of a clear text digital video content; and
in a bridge, securely receiving said clear text digital video content from said CPU and encrypting said clear text digital video content as cipher text, wherein said bridge includes a security engine that identifies a current context within an index of contexts, where the current context has a corresponding key used to implement said encrypting;
said bridge transmitting said cipher text to a memory coupled to said bridge by a first insecure data path;
said bridge providing said cipher text to graphics processing unit coupled to said bridge via a second insecure data path;
wherein video content is transmitted and stored as cipher text in portions of a digital content system susceptible to hacking of insecure interfaces so that transmission and storage of said video content is secure.

21. The method of claim 20 wherein said security engine identifies said current context based on a memory address.

* * * * *